US012677766B2

(12) United States Patent (10) Patent No.: US 12,677,766 B2

Ross et al. (45) Date of Patent: Jul. 14, 2026

(54) METHODS AND APPARATUS FOR INDOOR FARMING

(71) Applicant: Beanstalk, Inc., Herndon, VA (US)

(72) Inventors: Jack L. Ross, Arlington, VA (US); Michael D. Ross, Arlington, VA (US)

(73) Assignee: Beanstalk, Inc., Herndon, VA (US)

( * ) Notice: Subject to any disclaimer, the term of this patent is extended or adjusted under 35 U.S.C. 154(b) by 129 days.

(21) Appl. No.: 18/349,001

(22) Filed: Jul. 7, 2023

(65) Prior Publication Data

US 2025/0008898 A1 Jan. 9, 2025

(51) Int. Cl.
*A01G 31/06* (2006.01)
*A01G 31/04* (2006.01)

(52) U.S. Cl.
CPC ........... *A01G 31/06* (2013.01); *A01G 31/042* (2013.01)

(58) Field of Classification Search
CPC ...... A01G 9/0299; A01G 9/029; A01G 9/088; A01G 31/00; A01G 31/02; A01G 31/042; A01G 31/045
See application file for complete search history.

(56) References Cited

U.S. PATENT DOCUMENTS 4,495,725 A * 1/1985 Talbott ................. A01G 9/0295
47/85
4,854,075 A * 8/1989 Greiling ............... A01G 9/0295
47/73

5,533,299 A 7/1996 Kratky
6,095,347 A * 8/2000 Mauro-Vetter .......... B65G 1/02
211/151
8,151,518 B2 4/2012 Adams et al.
8,327,582 B2 12/2012 Storey
9,288,948 B2 3/2016 McNamara et al.
9,675,014 B2 6/2017 Hassle
9,974,252 B2 5/2018 Aykroyd et al.
(Continued)

FOREIGN PATENT DOCUMENTS

DE 4004154 A1 * 8/1991
NO 20211565 A1 * 2/2023
(Continued)

OTHER PUBLICATIONS

Invitation to pay additional fees for International Application No. PCT/US2023/069832, dated Sep. 26, 2023, 2 pages.
(Continued)

*Primary Examiner* — Son T Nguyen
(74) *Attorney, Agent, or Firm* — Casimir Jones, S.C.; Brian F. Bradley

(57) ABSTRACT

Embodiments described herein generally relate to systems and methods for indoor farming. Containers having a lid and a basin can be used to grow plants in stagnant liquid growing medium (e.g., water and nutrients). The lid can contain solid growing medium (e.g., dirt) and seeds and/or plants. The lid can define slots that allow roots of plants to access the liquid growing medium. The containers can be stored in bays of a dense vertical rack system. Each bay can include a gravity feed system. A gantry can be operable to deposit containers into and retrieve containers from bays. Containers can be left in bays for plants to grow with no recirculation or agitation of liquid within the basins and little or no handling.

12 Claims, 13 Drawing Sheets

(56) References Cited

U.S. PATENT DOCUMENTS

| | | | |
|---|---|---|---|
| 10,542,685 | B2 | 1/2020 | Buelow |
| 2010/0014485 | A1 | 1/2010 | Henry et al. |
| 2012/0054061 | A1 | 3/2012 | Fok et al. |
| 2013/0247462 | A1 | 9/2013 | Leslie |
| 2017/0231175 | A1 | 8/2017 | Galonska et al. |
| 2017/0339846 | A1 | 11/2017 | Lawrence et al. |
| 2019/0021238 | A1 | 1/2019 | Alexander et al. |
| 2019/0021249 | A1 | 1/2019 | Ivanescu et al. |
| 2019/0230876 | A1 | 8/2019 | Lysaa |
| 2020/0214226 | A1 | 7/2020 | Yukawa |
| 2021/0195847 | A1 | 7/2021 | Cuello et al. |
| 2021/0267133 | A1 | 9/2021 | Belanger |
| 2022/0225577 | A1 * | 7/2022 | Robell ................... A01G 31/06 |
| 2022/0225579 | A1 * | 7/2022 | Robell ................... A01G 9/249 |
| 2023/0148499 | A1 | 5/2023 | Fujisawa et al. |

FOREIGN PATENT DOCUMENTS

| | | | | |
|---|---|---|---|---|
| WO | WO-2016129674 | A1 * | 8/2016 | ............ A01G 31/04 |
| WO | WO-2016166311 | A1 | 10/2016 | |

OTHER PUBLICATIONS

International Search Report and Written Opinion for International Application No. PCT/US2023/069832 , dated Jan. 23, 2024, 12 pages.

\* cited by examiner

100

| Top Rail 173 |
|---|

| Bay 110 |
|---|

Container 120

Container 120

| Bay 110 |
|---|

| Bay 110 |
|---|

Container 120

Container 120

Container 120

Gantry 170

| Bottom rail 171 |
|---|

METHODS AND APPARATUS FOR INDOOR FARMING

TECHNICAL FIELD

The embodiments described herein relate to methods and devices for farming indoors, typically without irrigation. More particularly, the embodiments described herein relate to a portable container and accompanying apparatuses used for growing plants in a dense three-dimensional array. Certain containers and accompanying apparatus are constructed such that they are compatible with standard material handling equipment (e.g., forklifts, racking, flow rails, conveyors).

BACKGROUND

Controlled environment agriculture is capable of growing produce that is more flavorful, sustainable, and available than conventional agriculture. These qualities are particularly important today, because wellness and healthy eating are rapidly growing trends among consumers, but those consumers are often left choosing produce from conventional farms that is bland, expensive, unavailable, and/or often spoiled. Controlled environment agriculture allows a wider variety of seeds to be grown closer to consumers which creates fresher and tastier options by reducing travel time and removing the risks from pests, climate, or soil makeup. Moreover, controlled environment agriculture eliminates water pollution and reduces water consumption relative to conventional farming methods.

However, current technologies used in controlled environment agriculture are very complex and expensive, which has severely limited wide-scale adoption. Much of the expense and complexity results from the infrastructure needed to build indoor farms, store growing plants, and frequently irrigate plants.

Some known devices and methods for controlled environment vertical farming include aeroponic systems, drip and nutrient film technique (NFT) irrigation systems through gutters, deep water culture, and flood and drain systems. Accordingly, each of these technologies require large initial investments to pay for the complex infrastructure and irrigation systems to reach the plants on all levels. These irrigation systems increase operational complexity, and they require additional space for pipes and human access aisles. Due to these recirculating irrigation systems, expensive, synthetic grow media is often required to prevent clogging in nozzles and/or pumps. Aeroponic systems, moreover, will often fail when electrical power is lost as the plants need to be continually irrigated. This irrigation method results in a need for backup generators and complex control systems to ensure plants are always receiving proper irrigation.

Another drawback is that these systems are typically built from the ground up, requiring a great deal of time to get up and running. Greenhouses, which often use NFT or deep water culture, require entirely new structures to be built which can take years to select a site, construct, and then install the custom hydroponic equipment like gutters for NFT or ponds for deep water culture. Vertical farms, on the other hand, can often use an existing warehouse, but the construction of their intricate infrastructure that enables irrigation systems to access every plant adds a great deal of expense and time. Additionally, the need to access irrigation systems in the event of failure necessitates many service access areas around the infrastructure, often aisles between every tower in a vertical farm or gutter in a greenhouse.

These access areas reduce the density of the farm and thus increase real estate costs. All of these disadvantages work together to increase the cost of building and maintaining a controlled environment farm.

Thus, a need exists for an improved device and methods for vertical farming that maintains the benefits of existing systems, including conserving water, eliminating runoff, and enabling local production of produce while also removing the need for complex irrigation systems, allowing growing plants to be easily moved, growing a wide variety of plants, and using inexpensive, natural, and reusable media (or medium) such as dirt or soil. Additionally, there is a need for a system robust and capable enough to withstand power outages and other events as people often depend on the food produced by the system. Finally, there is a need for a system that can use inexpensive and naturally abundant materials such as dirt or soil to grow as well as common infrastructure such as pallet racking to reduce the cost and time to build a facility to grow food.

SUMMARY

Some embodiments described herein relate to a novel container for growing plants. This container can have a size and shape similar to a pallet so that it is compatible with standard material handling equipment and infrastructure. A lid that has a pattern of trenches that can be filled with soil, dirt, or other growing media. These trenches can contain an opening at the bottom of the trench to enable roots to pass through the lid into a basin defined by the container that is underneath the lid. The basin can contain a solution with dissolved nutrients relevant to crop growth. The basin may be of varying height to contain different amounts of solution. Within the basin, there may be baffles to control the solution while the basin is accelerating, for example when the container is moved. Both the basin and the lid may have ribbing and structural details to limit deformation caused by the weight of the water when supported on two points, such as when lifted by a forklift. To meet the varied needs of different crop types, interchangeable lids may be placed on the basin, and the lid may contain an access hole with a cap for filling the basin with water when a lid is placed on top of a basin. Hydrogels may be placed in the basin to aid in chemically balancing the nutrient solution over a period of time.

To begin growing plants, soil, dirt, or other media are placed in the trenches of the lid. Seeds may then be deposited on top of the media, then (optionally) covered by more media, and wetted with water, which may contain nutrients. Alternatively, seeds may be mixed into the media prior to the media being placed in the trenches of the lid. In some embodiments, plants may germinate in the lid while it is stacked in a dense array of other lids, one on top of the other. After the plant germinates, as indicated by roots emerging through the openings at the bottom of the trenches, the lid may be placed on top of a basin. The basin can be filled with a solution such that the level of the top of the solution does not contact the bottom of the lid. As the lid is placed on the basin, some roots are submerged in the solution. As the plant grows, the plants uptake the solution from the basin and create an increasingly large air gap between the top of the solution and the bottom of the lid. This air gap triggers the formation of very thin root hairs, which provide the plant with an enhanced ability to absorb the oxygen they need from the air in the headspace of the basin. The configuration of lid and basin, with an airgap between, promotes the growth of such root structures and enables the use of stagnant water, which would normally prevent the growth of crops due to its quickly depleted dissolved oxygen. This further eliminates the need for connected irrigation systems and water oxygenation devices commonly found in existing hydroponic systems.

The lid and basin together form a plant container, which when containing germinated plants and filled with solution, will grow anywhere there is light and an appropriate environment for the type of plant contained. To deliver the appropriate light, create the optimal environment, maximize density, and reduce labor demands, an automated storage system has been developed. This storage system contains bays arranged in a vertical and horizontal pattern similar to shelves. Each bay contains LED lights to deliver energy to the plant to power photosynthesis. Underneath the lights are a system of conveyors on which plant containers may sit. The conveyors are tilted at an angle to use the force of gravity to drive the plant containers forward to the lowest end of the conveyors, at the front of the bay. The bay can be enclosed on all sides except the front and/or back. At the front of the conveyors are gates that may be rotated to enable plant containers to be loaded into the bay or removed from the bay. The gates are unevenly weighted around their pivot point such that they are normally closed due to the force of gravity. In some embodiments, a computer-controlled gantry system can be positioned across the front of the storage system. The gantry can be capable of moving plant containers between an entry or exit point and any bay of the tower. This gantry system can have a conveyor that can interface with the gravity conveyors within the storage system and keep the plant containers level during movement. The gantry system can ride on a structural rail that is attached to the storage structure so that the gantry system frame of reference is always that of the storage structure, regardless of the flatness of the floor the system sits atop. The gantry can be operable to move plant containers in two axes across the face of the storage system and may also be able to remove containers from bays and push containers into bays, which can sometimes hold up to 12 containers or more, all on a gravity conveyor. The gantry can have sufficient actuators and sensors to enable safe and autonomous operation. The gantry can also have an end effector capable of opening and closing the gates at the front of the bay. A festoon or cable chain may deliver power, air, or water to the gantry. A system may be included on the platform of the gantry for filling the plant container with solution during movement.

Some embodiments described herein relate to a system that includes multiple containers each including a basin and a lid. Each basin can be filled with a solution of water and nutrients, and each lid can contain a solid growing medium and plants and/or seeds. An opening in each lid allows plant roots to protrude into the basin and access the solution of water and nutrients. The containers can be stored in bays of a three-dimensional a rack. Each bay is configured to accept at least two containers a single stack configuration. Each bay can include a gravity feed system configured to urge containers from the plurality of containers towards a front of the rack. Each bay can include a light source and be configured to allow plants in the containers to grow.

Some embodiments described herein relate to a system that includes multiple containers, each including a basin and a lid. Each basin can be filled with a solution of water and nutrients, and each lid can contain a solid growing medium and plants and/or seeds. An opening in each lid allows plant roots to protrude into the basin and access the solution of water and nutrients. The containers can be stored in bays of a three-dimensional rack. Each bay is configured to accept at least two containers in a single-stack configuration. Each bay can include a light source and be configured to allow plants in the containers to grow to maturity without recirculation or agitation of the solution of water and nutrients in the containers.

Some embodiments described herein relate to a method for growing plants in an indoor environment that includes loading containers into a rack system. Each container can include a basin filled with water and nutrients and lid containing a solid growing medium and seeds and/or plants. An opening in the configured to allow plant roots to access liquid in the basin. A gantry can deposit the containers in the bays. The gantry can push a container and containers behind it (e.g., for a total of three or more containers) for growth and storage.

Some embodiments described herein relate to a method for growing plants in an indoor environment that includes placing a lid containing a solid growing medium and seed in a storage area for germination. After germination, the lid can be placed atop a basin to form a container, the basin can contain water and nutrients. The lid can include one or more openings to allow roots of the plants to protrude through the lid and into the basin such that the roots can access the water and nutrients. When the lid is placed atop the basin, no portion of the lid contacts the liquid. The container can be stored in a climate-controlled environment such that the plant can grow to maturity in the container, with roots accessing the liquid, without agitating or recirculating the liquid.

DETAILED DESCRIPTION

Figure 1:
FIG. 1 is a schematic illustration of a rack system for vertical farming, according to an embodiment.

FIG. 1 is a schematic illustration of a rack system suitable for vertical farming, according to an embodiment. The rack system can be a three-dimensional array of bays 110 and is typically constructed of commercially available modular warehouse racking configured to store palletized goods, although techniques to construct shelves and/or bays are also possible. FIG. 1 schematically depicts a side view of the rack system, such that other columns of bays are disposed behind the visible bays 110. It should be understood that a rack system can have any suitable height and width, including systems a single bay high or a single bay wide. The rack system can be installed indoors, in a climate-controlled environment, such as a warehouse.

Each bay 110 can be enclosed on at least four sides (bottom, left, top, right). A lighting system (e.g., commercially available LED grow lights) can be coupled to the top (ceiling) of the bay, or in some instances on the left and/or right walls. It may be desirable for lights to be suspended from the ceiling and/or stand off from the walls to improve thermal management. Similarly stated, suspending the lights can increase air flow and improve cooling of lights, as compared to flush mounted lighting systems. Enclosed bays 110 can be desirable because it can allow for fully independent lighting control of each bay. For example, it may be desirable to vary the duration of illumination, intensity of illumination, or spectrum depending on which plants are in which bays and/or the growth stage of plants within a bay. Enclosing the bays 110 can thus improve flexibility of the system. It should be understood, however, that in other embodiments, the ceiling/floor between some or all bays may be at least partially open, for example by being constructed of wire, slats, or rollers. Similarly, some or all walls can be at least partially open and/or may consist of periodically spaced vertical posts connected by relatively short beams.

Each bay 110 is configured to hold one or more containers 120. In an exemplary embodiment, each bay 110 can be 22" tall, but it should be understood that other heights are possible. For example, for shorter crops, such as broccoli and microgreens, bay heights of 10" may be suitable. Furthermore, placing crops in a bay with the light source only a small distance above the crop may promote increased growth efficiency. Alternatively, for tall growing crops, such as sunflowers or *cannabis*, bays of 6-10' or taller are possible. In some embodiments, different bays can have different heights and crops can be moved to progressively taller bays as they grow.

As shown schematically in FIG. 1, not all bays need be equally loaded with containers. For example, some bays may be empty or only partially filled. As discussed in further detail herein, each container 120 can be at least partially liquid filled and contain seeds and/or plants. Although single depth rack systems and/or rack systems two containers deep that are open on both ends and accessible by forklift or other equipment are possible, embodiments described herein generally relate to inclined bays that are at least three containers deep and configured to be accessed from the front via a connected gantry 170. Bays that are at least three containers deep represent a significantly denser arrangement relative to known indoor growing systems, which are typically at most two containers deep to allow access to any container, which may be necessary using known hydroponic and similar systems due to extensive plumbing requirements and potential for leaks. In bays that are three or more containers deep, the middle containers are not accessible while in storage. Embodiments described herein that allow plants to grow in stagnant water facilitate such deep and dense bays. It should be understood, however, that in alternative embodiments, bays being one or two containers deep are also possible.

Containers 120 can be placed one behind another within the bay 110. An inclined conveyor or flow rail system can be disposed in each bay 110 to form a gravity feed system, such that when one container is removed from the front of the bay, the remaining containers slide forward. A gate (not shown in FIG. 1) can prevent the containers from falling out the front of the bay 110. In some embodiments, each bay can be configured to hold 10, 12, 15, or 20 or more containers 120. The ability to store such a large number of containers 120 back-to-back within a bay 110 represents a significant increase in density compared to known indoor farming systems, which are typically only 1 or 2 containers deep to allow access for plumbing and other utilities between containers. In contrast, depth of a bay 110 according to the present disclosure is typically limited only by the weight of the containers behind it on the gravity feed system. In use, the front-most container 120 may be subjected to approximately 80 lbs in bay loaded 10-deep. As discussed in further detail herein, containers 120 can be constructed with ribs or other structural features to improve their crush strength. Containers, gates and equipment for adding/removing containers from very deep bays (e.g., 20 or more containers) can be designed to accommodate the weight of a large number of containers.

Figure 2:
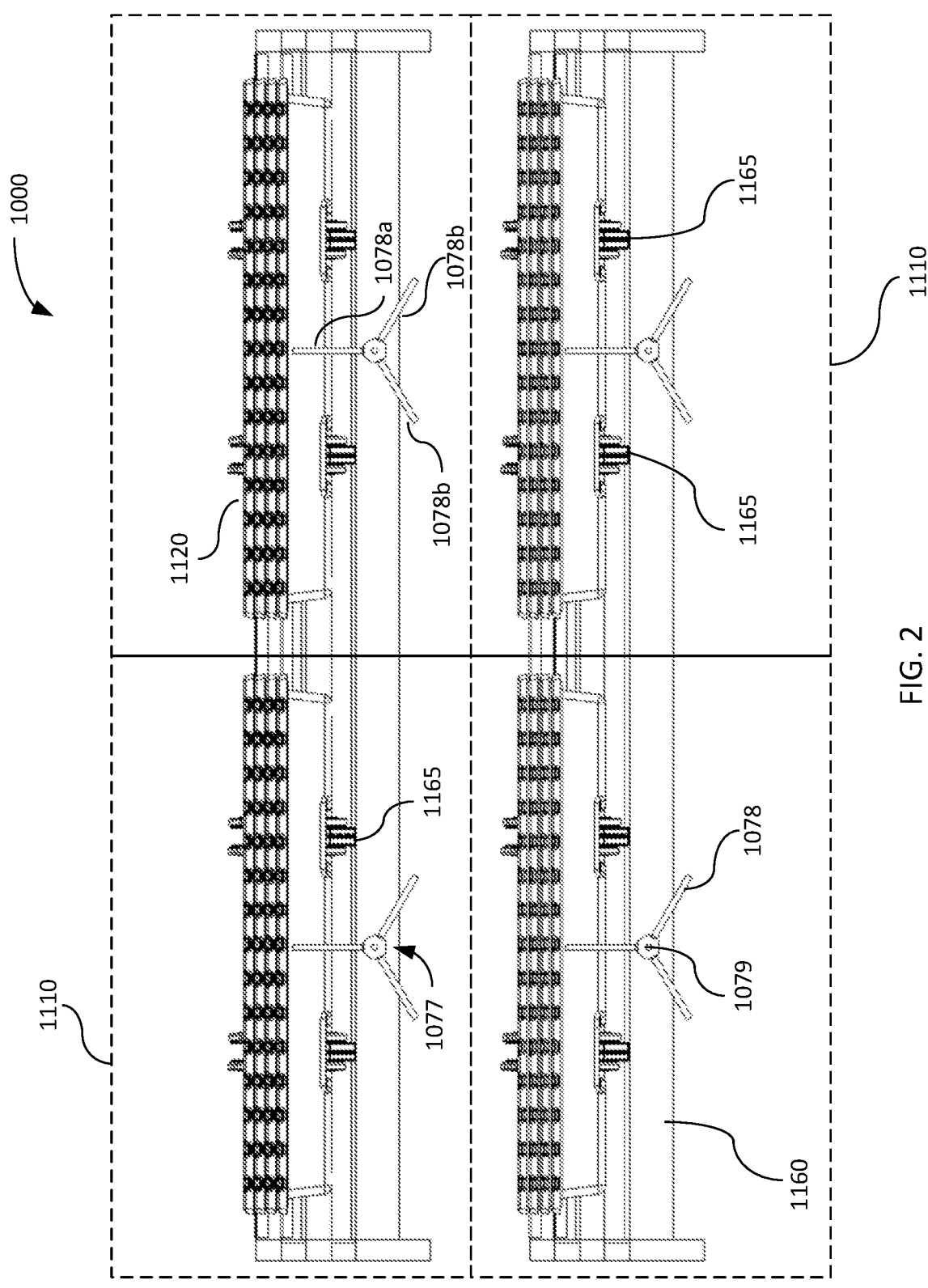
FIG. 2 is a front view of a rack system for vertical farming, according to an embodiment.
Figure 3:
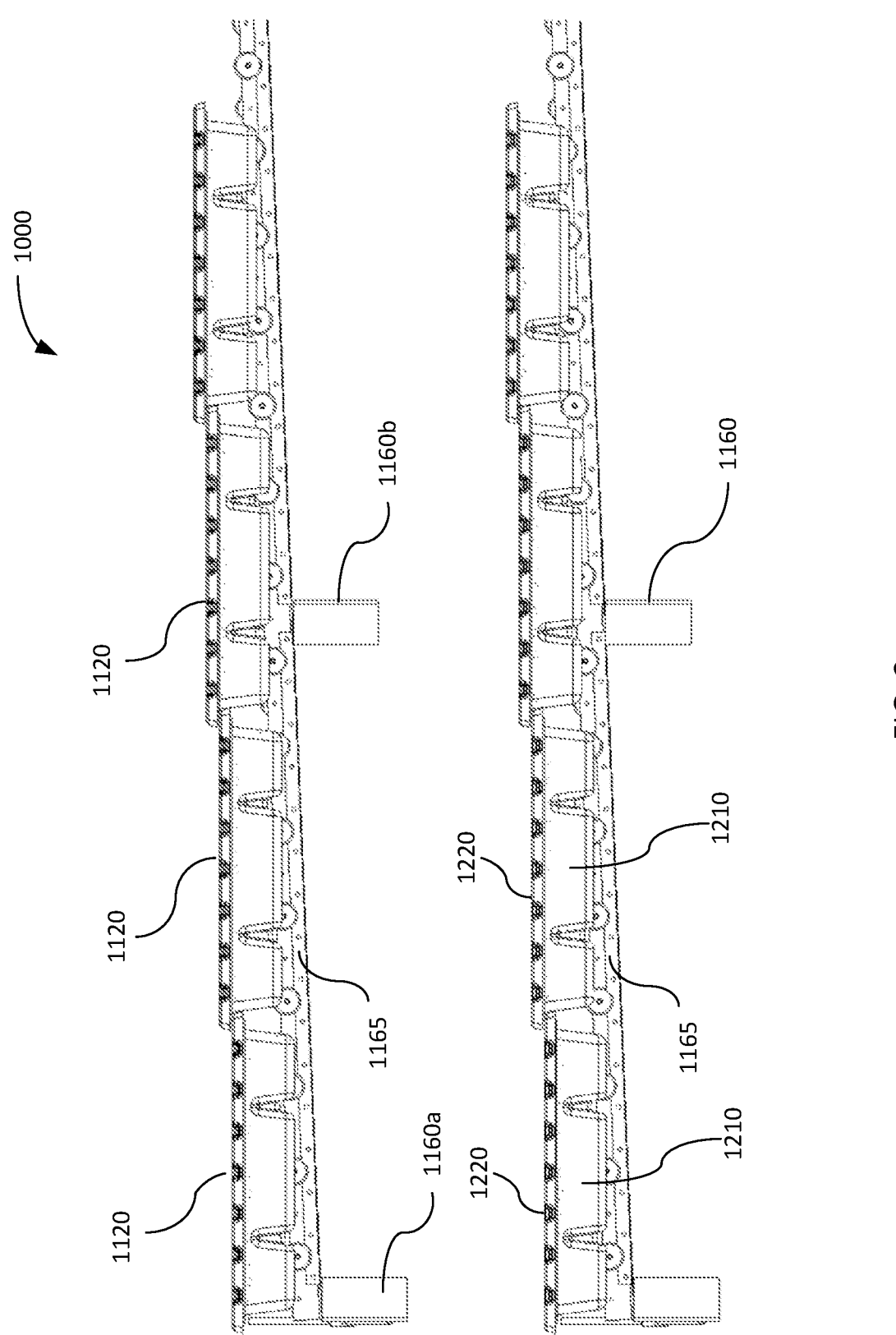
FIG. 3 is a side view of the rack system of FIG. 2.
Figure 4:
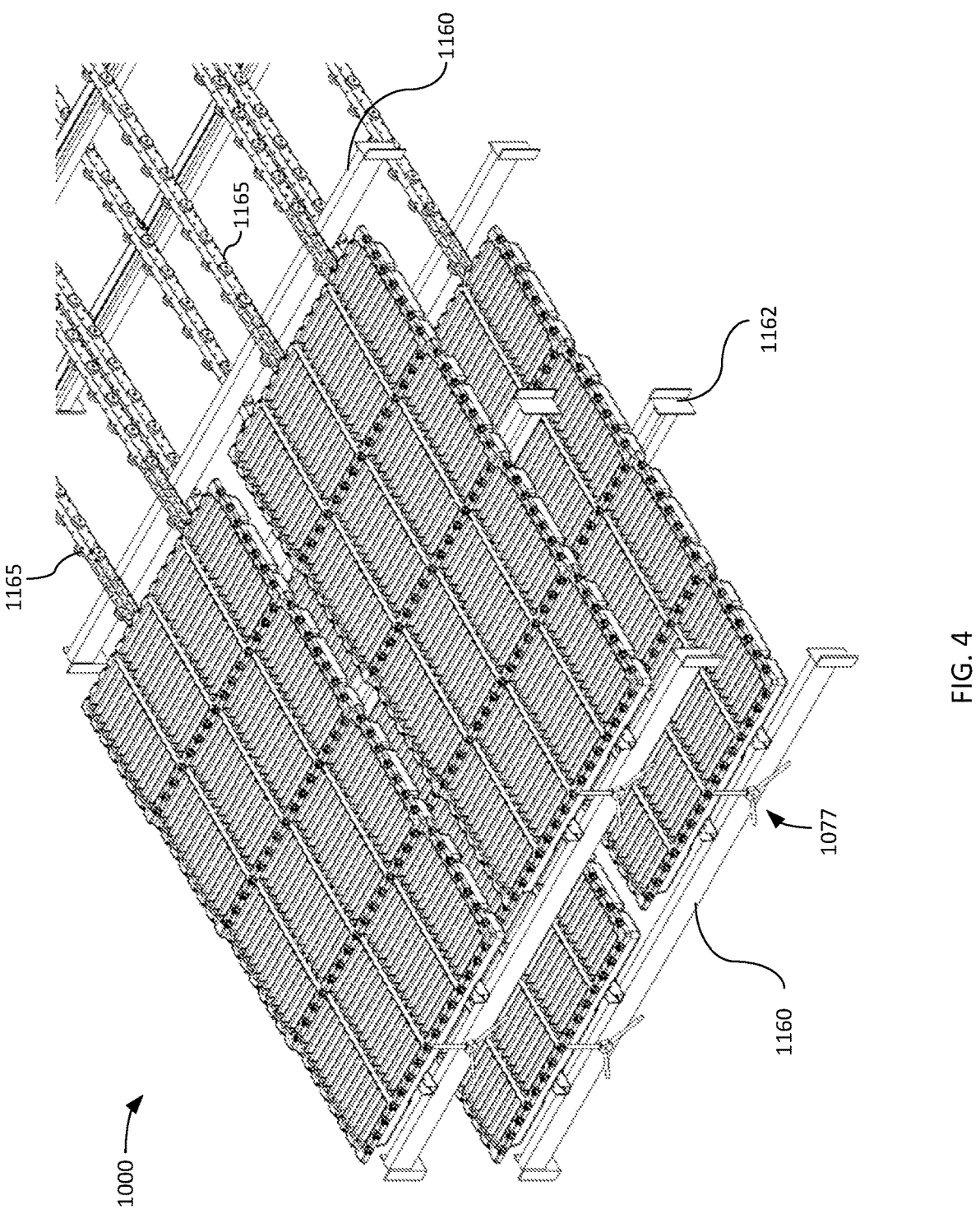
FIG. 4 is an isometric view of the rack system of FIG. 2

FIG. 2 is a front view of a rack system 1000 suitable for vertical farming, according to an embodiment. FIG. 3 is a side view of the rack system 1000, and FIG. 4 is an isometric view of the rack system 1000. Rack system 1000 can be structurally and/or functionally similar to rack system 100 shown and described above. Structural elements of the rack system 1000 can be commercially available modular warehouse rack and/or pallet rack components. FIGS. 2-4 depict horizontal beams 1160. For ease of illustration. vertical supporting members are not shown for ease of illustration, but a person skilled in the art could readily select suitable posts to be coupled to beam ends 1162 based on size and weight specifications. For example, ladder frame and/or trussed rack uprights are readily commercially available. Additional structural elements, such as crossbars or truss members can also be selected and added as needed or desired to form a substantially rigid rack or shelf structure suitable to store a desired number of containers 1120. As discussed in further detail herein, optionally walls can separate bays 1110 horizontally and/or decking can separate bays 1110 vertically. Typically, walls and/or decking will be lightweight nonstructural elements. For example, walls and/or decking can be constructed of corrugated polypropylene sheeting, plywood, and/or corrugated steel.

Beams 1160 can increase in vertical height with increasing depth in the bay. For, example, as shown in FIG. 3 beam 1160*b* is vertically higher than beam 1160*a*, creating an incline. In an exemplary embodiment, beams can be spaced 4' apart and each beam can be 2" higher than the beam in front of it. It should be understood, however, that other inclines are possible. For example, a steeper incline may be desirable for particularly lightweight containers (e.g., those containing a relatively small amount of liquid). Flow rails 1165 can be coupled to beams 1160, also at an incline, to form a gravity feed system. As shown in FIGS. 2-4 a pair of feed rails 1165 can be disposed in each bay 1110 and configured to interface with grooves of containers (e.g., grooves 230 shown and described below with reference to FIG. 6). Other implementations, such as bay-spanning rollers are also possible. An advantage of a gravity feed system is that it is a completely passive device that urges containers 1120 towards the front of bay 1120, where they can be accessed and/or removed. However, mechanized (e.g., flat) conveyors and other feed systems are also possible.

As discussed in further detail herein, each container 1120 can include a basin 1210 and a lid 1220. As shown best in FIG. 3, container 1120 size and incline can be collectively configured such that the lid 1220 of each container 1120 nests below the lid 1220 of the next container 1120 back, contacting the basin 1210 of that subsequent container 1120. Such an arrangement can improve density and improve load distribution. For example, the portion of the front/downhill lid 1220 contacting the basin 1210 immediately behind/uphill from it can be closely fitted to a lip of the basin 1210, such that loads are transmitted from basin 1210 to basin 1210 and lids 1220 are not subject to significant compressive forces. As discussed in further detail herein, the basins 1210 can be formed or molded with ridges or other stiffening features, or be fitted with braces, which may give them more structural rigidity and resistance to crushing than the relatively thin lids 1220.

A gate 1077 positioned at the front of each bay 1160 restrains forward motion of the containers 1120. Gate 1077 includes three arms 1078 in a Y-configuration arranged around a central pivot 1079. In the closed position, the gate 1077 resembles an inverted Y, with the uppermost arm 1078*a* blocking containers 1120 from exiting the bay 1110. The lower arms 1078*b* can be unevenly weighted, such that the center of gravity is below the pivot 1079 and the gate automatically closes due to the force of gravity. Rotating the gate by approximately 120 degrees can open the gate. For example, as discussed in further detail herein, a gantry can engage one of the lower arms 1078*b*, rotate the gate 1077 such that the upper arm 1078*a* is below the bottom of the container 1120, allowing containers 1120 to be removed from or placed into the bay 1110. Once the lower arm 1078*b* is released, the gate 1079 can automatically rotate back into the closed position.

Figure 5:
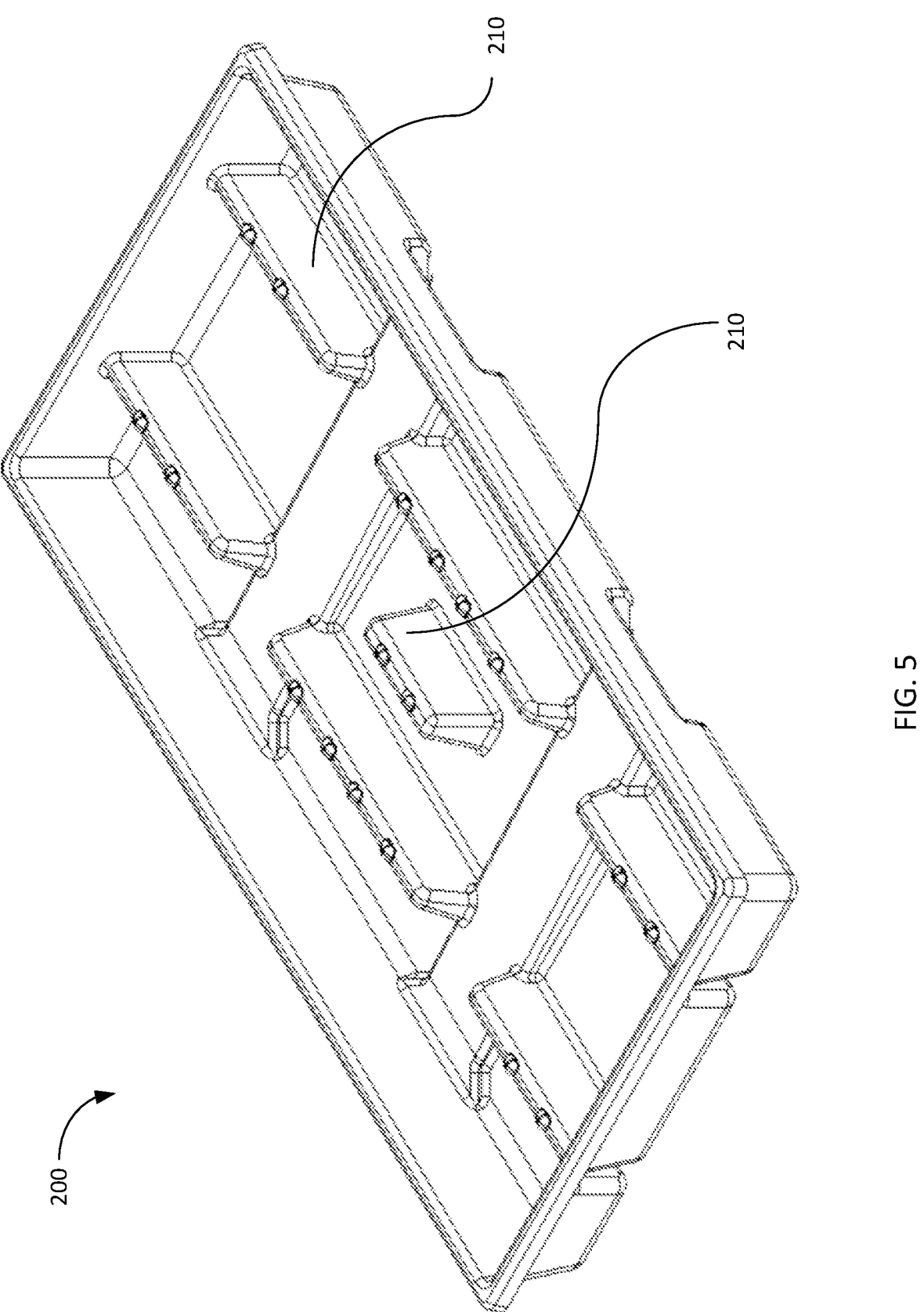
FIG. 5 is a top isometric view of a basin, according to an embodiment.
Figure 6:
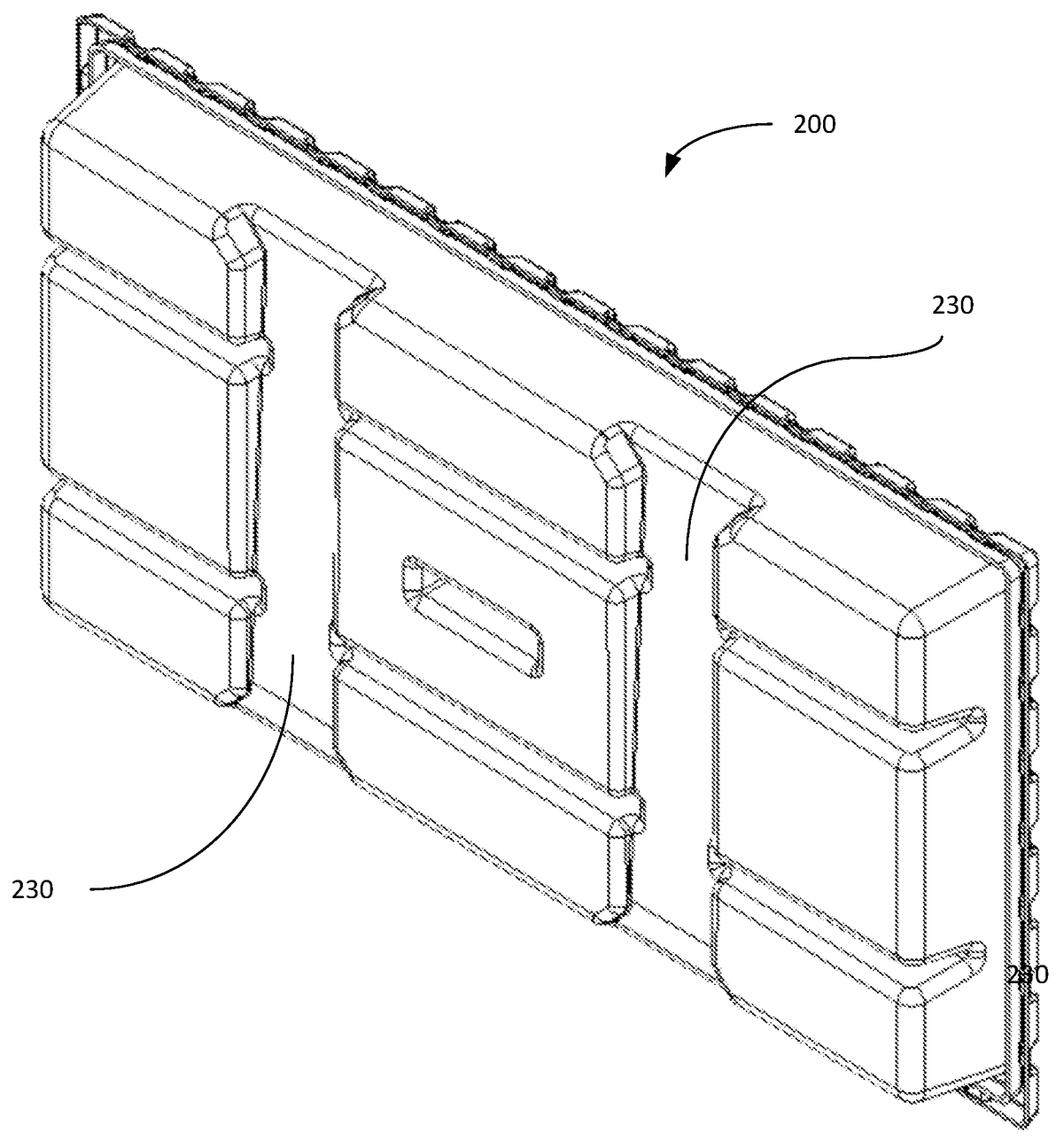
FIG. 6 is a side isometric view of the basin of FIG. 5.

FIG. 5 is a top isometric view of a basin of a basin 200 of a container 220, according to an embodiment. FIG. 6 is a side isometric view of the basin 200. The basin 200 can be any suitable size, but it can be advantageous for the basin 200 to have approximately width of a standard pallet (40"+/−20%), as this can allow for the use of warehouse equipment designed for movement and storage of palletized goods. For example, grooves 230 can be sized and shaped to accept forklift tines and/or conveyor flow rails that make up a gravity feed system in the bays. Container length can be selected for ease of handling and production quantity, but in some implementations can range from approximately 10" to 60". In an exemplary embodiment, containers can have dimensions of 43.5"×22.5"×4.5", but it should be understood that containers of other sizes are possible. The container can be constructed of acrylonitrile butadiene styrene (ABS), high-density polyethylene (HDPE), stamped or molded steel, aluminum, or any other suitable material. As discussed above, in use the basin 200 may be disposed in a gravity feed system such that the weight of other liquid-filled containers behind and slightly above the container apply a load across the basin 200. Basin 200 can be operable to have a crush strength of at least 200 lbs, at least 400 lbs, at least 1,000 lbs, or any other suitable strength. In some embodiments, reinforcing ridges, braces, or any other suitable structural component can be molded/stamped into the container or added in a subsequent operation.

The basin 200 is configured to contain water and nutrients (e.g., solution containing water, phosphorous, nitrogen, sulfur, potassium, magnesium, calcium, zinc, nickel, boron, copper, iron, manganese, molybdenum, boron, chlorine, and/or any other micro or macro nutrients). In some implementations, approximately 8 gallons of solution can be added to each container. In other implementations other volumes of solution can be added, such as approximately 3 gallons, approximately 6 gallons, approximately 8 gallons, approximately 10 gallons, approximately 20 gallons, etc. (e.g., based on container size). Such a solution can be the same as or similar to commercial hydroponic nutrient solutions, although, as discussed in further detail herein, potentially at a higher concentration than is typically used in known indoor farming implementations. Baffles 210 within the basin 200 can reduce unwanted water sloshing and spilling when the basin 200 is moved.

Figure 7:
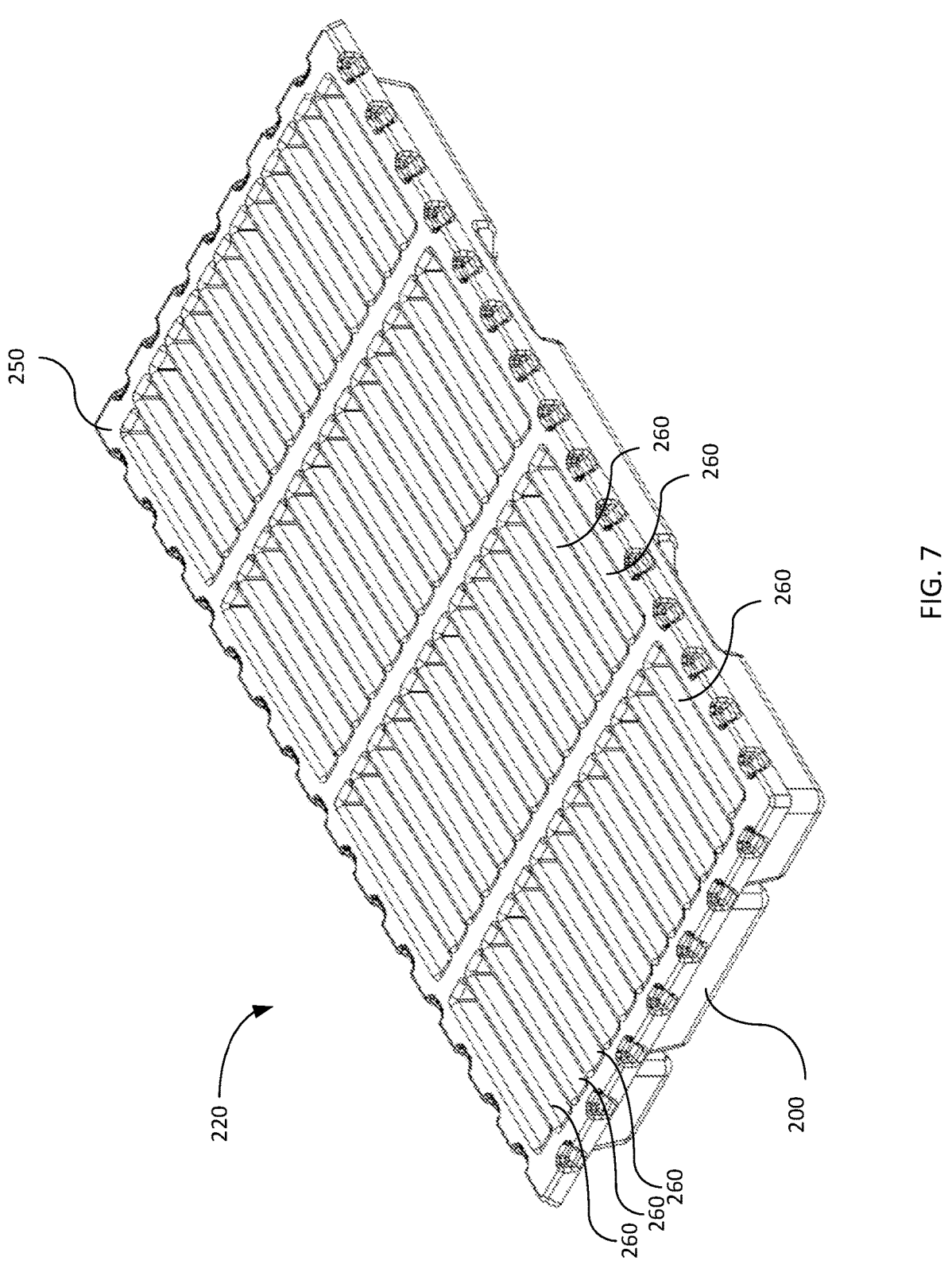
FIG. 7 is a top isometric view of the container, including a lid, according to an embodiment.

FIG. 7 is a top isometric view of a container 220, including a lid 250, according to an embodiment. The lid 250 can be sized and shaped to fit over the top of basin 200, forming a container 220. The lid 250 defines a number of trenches or slots 260. In an exemplary embodiment, slots measure 2.5" long, and 0.25" wide, but it should be understood that many other dimensions are possible and can be selected based on, for example, the type of crop grown, tendency of slots to spread during plant growth, ability to retain solid growing media, and ease of manufacture. Each slot 260 is configured to be filled with dirt or other solid media for growing plants. Each slot 260 has one or more holes, screens, or other openings configured to allow plant roots to grow into the basin 200 and access the solution contained therein. Slots 260 can also be operable to allow excess water or other liquid to drain from the solid media, while preventing or inhibiting the solid media from falling into the basin 200. For example, slots 260 can have holes less than 1" wide. Although not shown in FIG. 4, the lid can include an opening that can be used to refill the basin when the lid 250 is in place.

Figure 8:
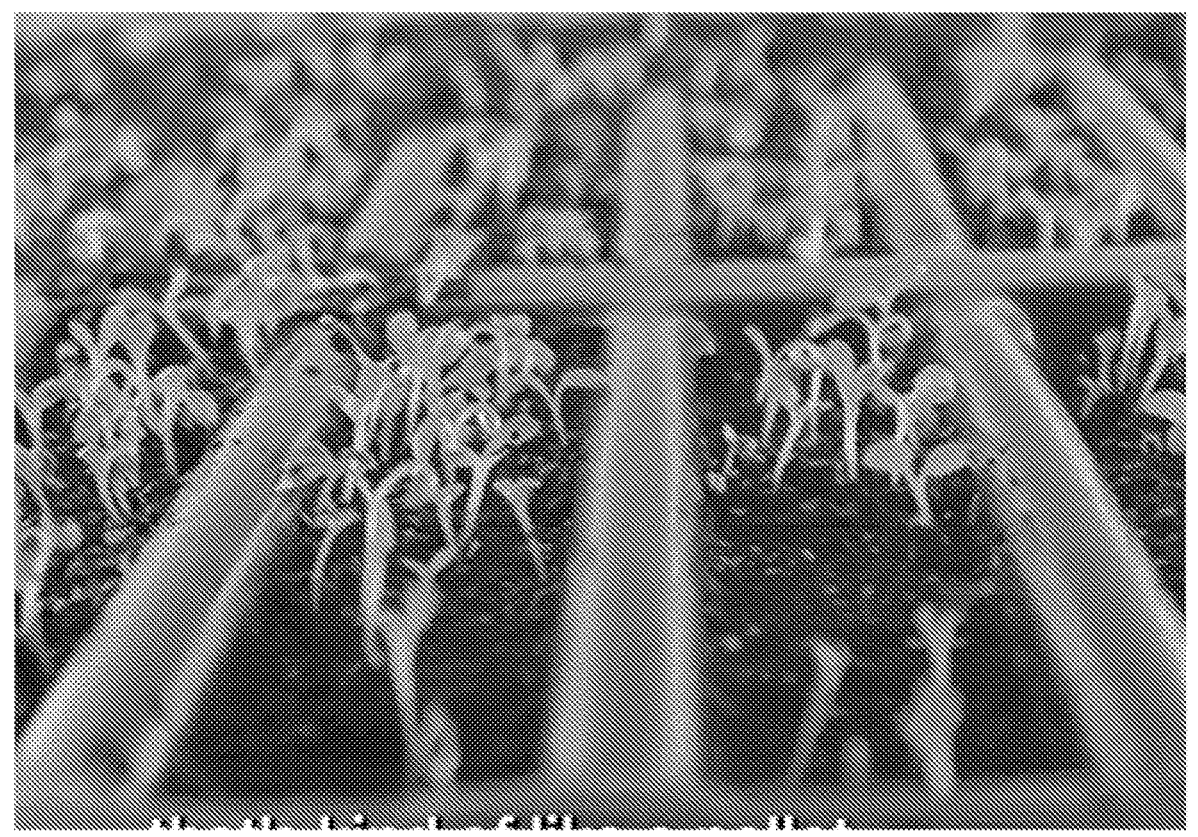
FIG. 8 is a photograph of a container with lid that is filled with soil and growing plants.

FIG. 8 is a photograph of a portion of an example lid filled with dirt and sprouting plants. As shown in FIG. 8, in some instances multiple seeds can be planted in each slot 260. It should be understood, however, that slot 260 size, size and shape of openings within slot 260, and/or planting density can be customized based on the crop.

Figure 9:
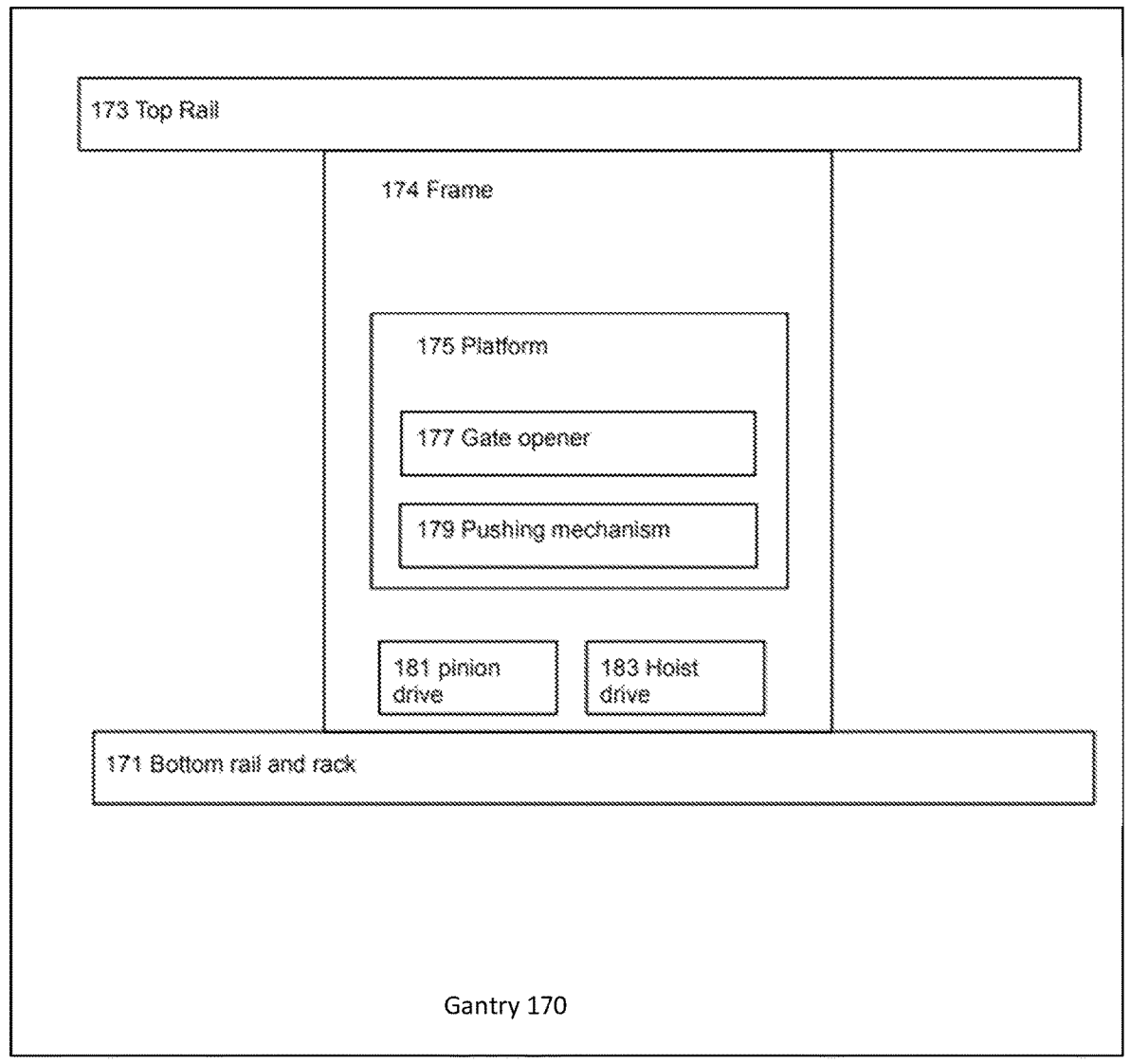
FIG. 9 is a schematic illustration of a gantry, according to an embodiment.

FIG. 9 is a schematic illustration of a gantry 170, according to an embodiment. A frame 174 of the gantry can be coupled to a top rail 173 and/or a bottom rail 171 which can be directly coupled to a rack system, such as the rack system shown and described above with reference to FIG. 1. Specifically, as discussed in further detail herein, the gantry 170 can be operable to place containers (e.g., basin 200), optionally including lids (e.g., lid 250) into bays (e.g., bays 110) and/or remove containers from bays. It may be desirable for the frame 174 to be directly coupled to the rack system, rather than rest on the ground, as this can reduce or eliminate challenges associated with encountering obstacles, moving the gantry 170 over uneven ground, or deviations in levelness or straightness of the rack system. It should be understood that other embodiments in which the frame 174 is not directly coupled to the rack system are also possible. Furthermore, although described as coupled to the top rail 173 and bottom rail 171 of the rack system, it should be understood that in other embodiments, the frame 174 may be connected only to the top rail 173, only to the bottom rail 171, and/or connected to any other rail or combination of rails or other structural components of the rack system. Similarly, the term "gantry," is used throughout because it describes a particularly suitable embodiment in which a robotic platform is supported by an overhead beam (top rail 173, which may be a structural element of the rack system, coupled to the rack system, or otherwise run parallel to a front of the rack system). It should be understood, however, that when used herein, "gantry" can be understood to include any platform operable to move between bays and insert and/or remove containers, regardless of how supported. For example, unless clearly specified otherwise, a scaffold-, columnar-, tower-, and/or cantilever-supported mechanized platform that can move between bays and insert and/or remove containers should be understood as being within the scope of the term "gantry."

The frame 174 can be constructed of t-slot extruded aluminum (e.g., 80/20) or any other suitable material and be operable to translate horizontally relative to the rack system. A platform 175 can be operable to translate vertically along the frame 174. In this way, the platform 175 can access any bay of the rack system. Any suitable motors or actuators can be used to maneuver the platform in two dimensions. For example, a pinion drive 181 coupled to the frame can be operable to interface with a rack disposed on the bottom rail 171 of the rack system. A hoist drive 183 can raise and lower the platform 175. Although not shown in FIG. 10, the frame 174 and/or platform 175 can include encoders, machine vision equipment, or any other suitable mechanism to locate and/or orient the platform 175 relative to the rack system. Similarly stated, the gantry 170 can include a computerized system operable to identify the position of the platform. Furthermore, gantry 170 can be operable to move the platform 175 to any bay, manually or as part of an automated task.

The platform 175 can be operable to remove a container from a bay. As discussed above, typically the rack system includes a gravity feed mechanism, in which containers are placed on an incline and are urged towards the front of the bay by their weight and/or the weight of containers disposed behind them. A gate in front of each bay prevents containers from falling out of the bay. The gate can be unevenly weighted around its pivot point such that it automatically closes due to the force of gravity. For example, the gate in the closed position can have the shape of an inverted Y, with a pivot through its center. In the closed position a vertical leg of the Y prevents the containers from falling out of the bay. The gantry 170 can include a gate opener 177 operable to open the gate and allow a container to move from the bay and onto the platform 175. For example, the gate opener 177 can be operable to rotate the Y-gate about its center point approximately 120 degrees so that the gate has the shape of an upright Y in the open position, allowing the container to be removed from the bay. When the gate is released by the gate opener 177, the force of gravity can cause the gate to automatically close. Once the container is removed, the platform can be moved to a destination location. For example, in some instances, the gantry 170 can move a container from one bay to another. In other instances, the gantry 170 may move the container from a bay to a conveyor belt for transport to a harvesting or storage location. In yet other instances, the gantry 170 can move the container to an offload position, such that the container can be retrieved by a manually operated or robotic forklift or other material handling equipment.

The platform 175 can also be operable to place a container into a bay. For example, the platform can receive a container at an onload position, where a forklift, conveyor, or other material handling device places a container on the platform. The gantry 170 can then move the platform to a destination bay, open the gate using the gate opener 177, and a pushing mechanism 179, such as a conveyor, screw jack, linear actuator, hydraulic or pneumatic ram, or motorized push bar can slide the container into the bay. In instances in which the bay already contains containers, the pushing mechanism 179 can push the container on the platform 175 into the first container in the bay, such that the container on the platform 175 is pushed into the bay and all containers already in the bay are pushed further back into the bay, usually up the inclined gravity feed mechanism.

Figure 10:
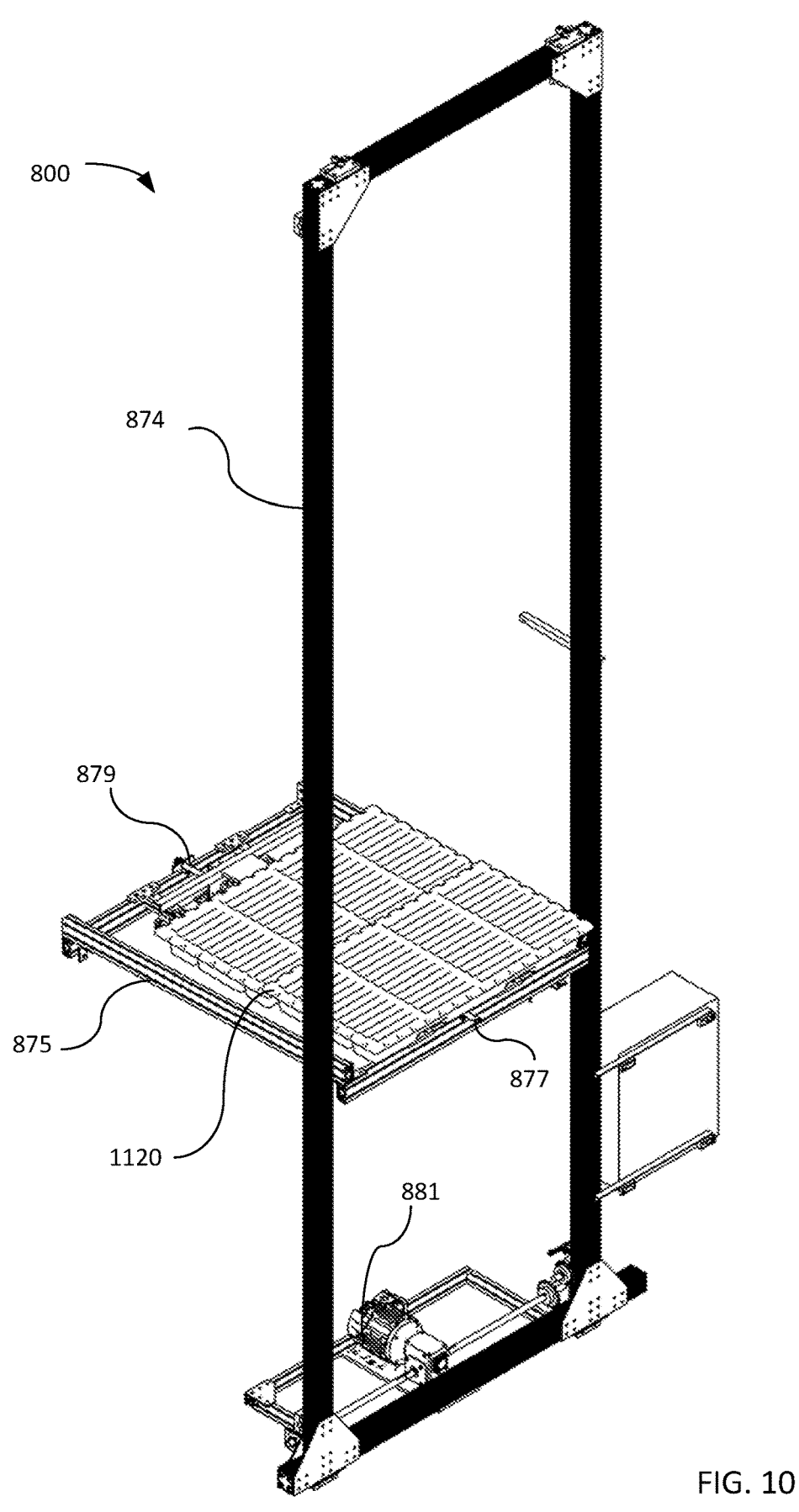
FIG. 10 is a perspective view of a gantry, according to an embodiment.

FIG. 10 is perspective view of a gantry 800, according to an embodiment. Gantry 800 and its various components can be structurally and/or functionally similar to gantry 170 shown and descried above with reference to FIG. 7. Hoist drive 883 is operable to move platform 875 vertically across frame 874, while pinion drive 881 is operable to engage a rack and translate frame 874 horizontally. Platform 875 is sized and shaped to hold a (e.g., one or more) container, and flow rails 865 or other conveyor or low friction surface is operable to allow container 1120 to slide forward or backwards (e.g., into or out of a bay). Although not shown in FIG. 8, the gantry can have a nozzle and plumbing that can be used to fill or refill containers. For example, containers can be periodically removed from the bays, refilled with water and/or nutrients, and then replaced in the rack system. In other embodiments, the gantry and/or platform can be sized and shaped to hold and/or move any number of containers to/from a bay.

Figure 11:
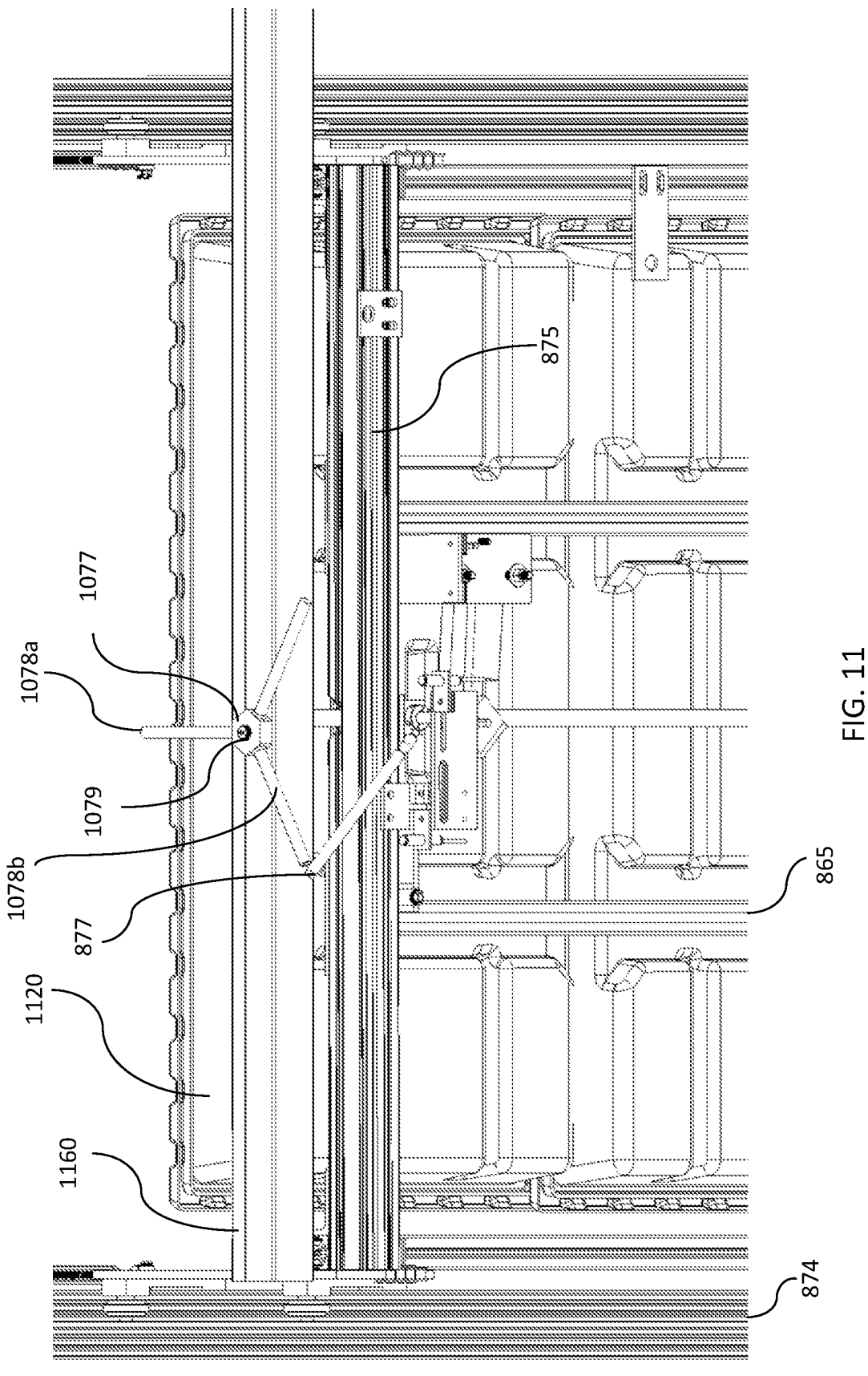
FIG. 11 is a close-up bottom view of the gantry of FIG. 10, showing a gate actuator and a gate in a closed position.
Figure 12:
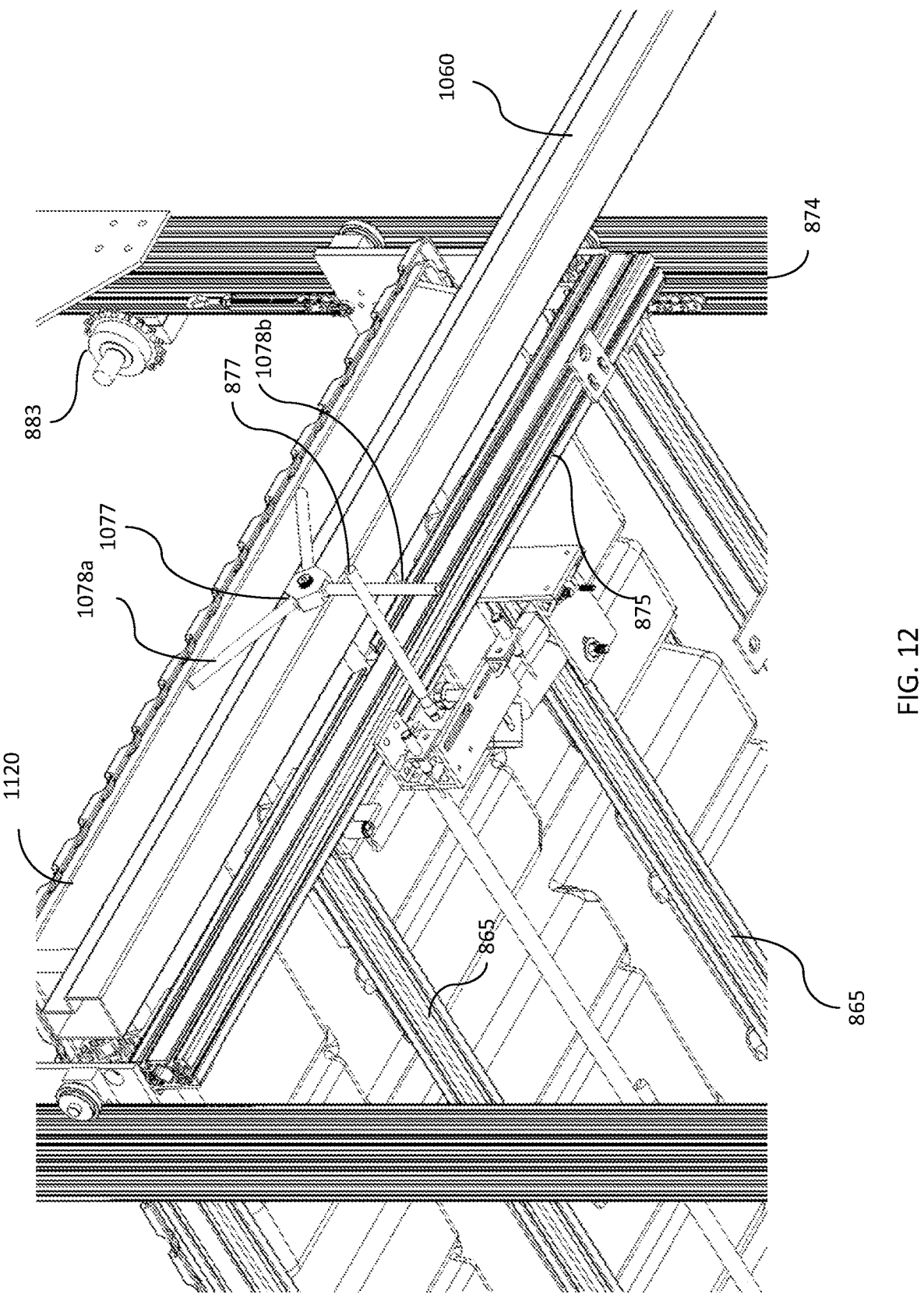
FIG. 12 is a close-up bottom perspective view of the gantry of FIG. 10, showing a gate actuator and a gate in an open position.

FIG. 11 is a close-up bottom view of the gantry 800 interfacing with the rack system 1000 of FIGS. 2-4, showing a gate actuator 877 and a gate 1077 in a closed position. As shown in FIG. 11, container 1120 is disposed on platform 875, and upper arm 1078*a* is in an upright position and blocking other containers within the rack system from moving towards the gantry and preventing container 1120 from being deposited into a bay. Gate actuator 877 is configured to engage and push lower arm 1078*b*, rotating gate 1077 about pivot 1079. FIG. 12 is a close-up bottom perspective view of the gantry 800, interfacing rack system 1000, showing gate actuator 877 and gate 1077 in an open position. Compared to FIG. 11, gate actuator 877 has translated horizontally (left to right), contacting lower arm 1078*b*, and moving upper arm 1078*a* to below a bottom of container 1120. In this way, the bay can be opened and pushing mechanism 879 can be operable to insert container 1120 into the bay. Similarly, when removing container from a bay, pushing mechanism can be fully extended to remove load from gate 1077 by pushing containers within the bay slightly further into the bay. Gate actuator 877 can then open gate 1077 and pushing mechanism can be retracted, allowing a container to slide from the bay onto the flow rails 865 of platform 875. Once removed, gate actuator 877 can move back to the position shown in FIG. 11, and the force of gravity can cause gate 1077 to automatically close.

Figure 13:
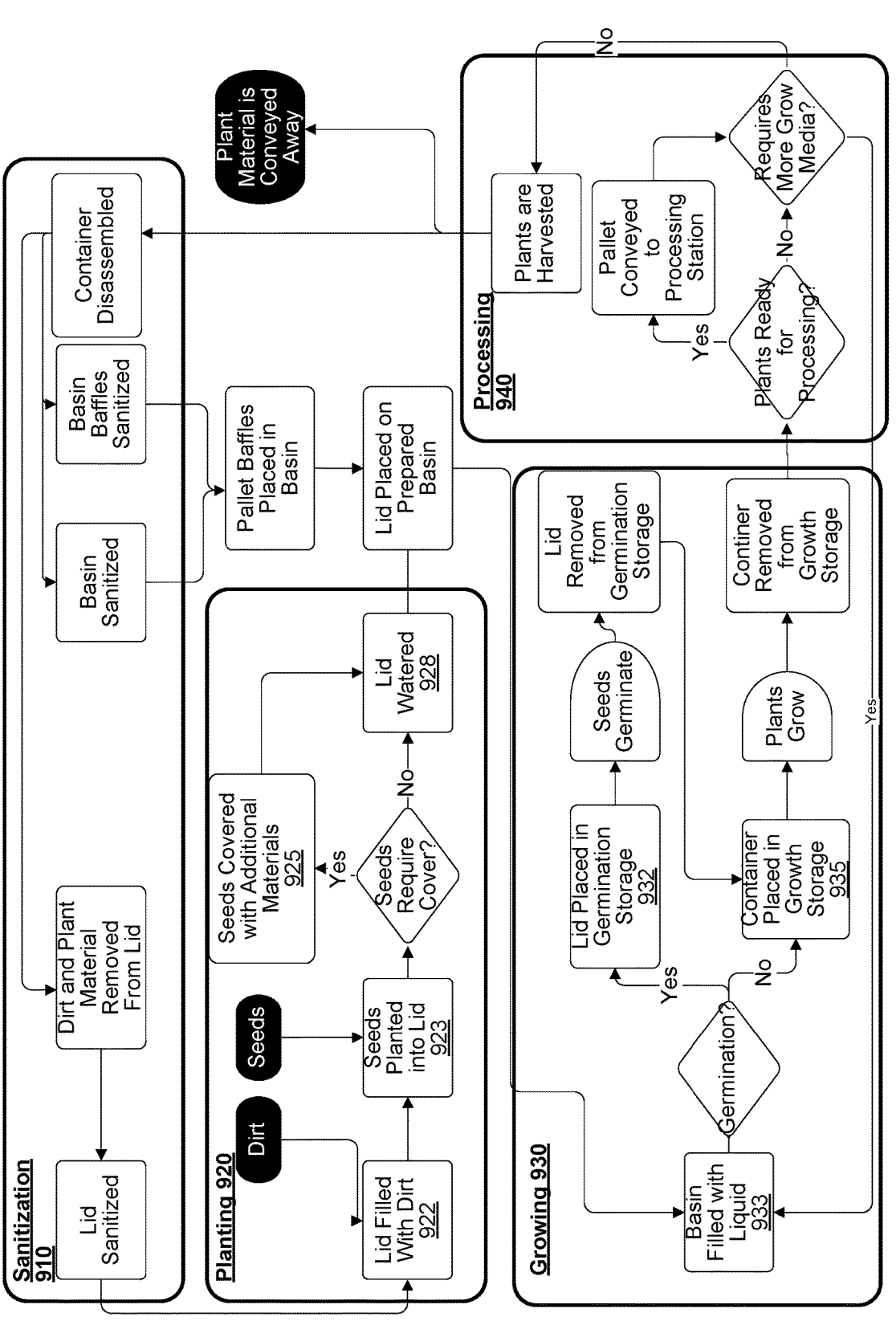
FIG. 13 is a flow chart of a method of farming, according to an embodiment.

FIG. 13 is a flow chart of a method of farming, according to an embodiment. The method of FIG. 13 is particularly well suited to vertical farming using containers stored in bays of a rack system discussed above. At 910, basins and lids can be sanitized. Dirt and any liquid (e.g., water and nutrients) can be removed. If necessary or desirable, subcomponents can be disassembled. For example, lids can be removed from containers, baffles removed from basins. Lids, baffles, and basins may be removably couplable via any suitable means, such as a snap-fit, tabs and slots, mechanical fasters such as screws or bolts, etc. Basins, lids, and/or baffles can be washed with hydrogen peroxide, soap and water, chlorine, or any other suitable cleaning solution. Although indoor farming is not typically susceptible to *salmonella* or other harmful pathogens associated with unsanitary water or untreated fertilizer, it may still be desirable to remove excess organic matter, algae, and/or biofilms that may accumulate in dark humid containers.

Planting occurs at 920. Typically, planting occurs in lids without containers. Slots in the lids can be filled with dirt or other suitable solid growing media at 922. In some instances, solid nutrients may be added to the dirt/slots. Seeds are then placed into the lid at 923. Seeds can be mixed with the dirt and added in a single operation or added after the dirt. For some plants or lid configurations it may be desirable to partially fill the slots with a first solid growing media, add seeds, then cover with a second solid growing media at 925, which may be the same or different from the first growing media. The lid can be sprayed with water and/or nutrients after planting at 928. Because the slots in lids have holes or openings, a single stack of lids may be watered at once, and liquid may run through the vertical stack of lids. In some instances, a perforated impermeable membrane, such as polyurethane, can be placed atop the lid to control the density and/or spacing of plants by allowing growth only through openings.

Once seeds are disposed in the dirt or other solid media, the grow operation begins at 930. Typically, seed is left to germinate on the lids at 932, without basins. Typically, no watering is required after planting and before germination, other than perhaps spraying the lids with water a single time immediately after planting, but lids may be periodically watered. Furthermore, lids may not require illumination prior to germination. Accordingly, while lids may be stored in bays of the rack system, they may also be stored in a climate-controlled storage area. Lids may be stacked atop each other while waiting for germination. For example, a stack of lids can be covered and stored on a standard pallet. In some implementations, lids can be covered, for example with a tarp, and/or heating blankets or other heating elements can be interspersed between lids and/or wrapped around lids.

Basins can be filled with water and nutrients at 933. Typically, basins will be filled such that the liquid level is just below (e.g., within an inch of) the bottom of the slots. Lids can be paced on the liquid-filled basin after plants have germinated and/or roots begin to appear protruding through the openings in the slots. Thus, basins can be filled such that, when lids are placed, no portion of the lid contacts the water. In other implementations, however, lids may be placed on basins immediately after planting. A container (basin with lid) can then be loaded onto a platform of a gantry. The gantry can be manually or automatically directed to a bay of the rack system 935, can open a gate to the bay and push the container into the bay, where it can be stored while the plants grow. Light and other environmental parameters can be controlled to improve growing efficiency.

With the lids on the basins, as the plants grow, their roots will pass through the openings and into the liquid, where they can absorb water and nutrients. Thus, the container can serve as a hybrid soil/hydroponic grow system. Unlike conventional hydroponic systems, however, the liquid in the container may never or rarely be recirculated, filtered, or replaced, which can greatly decrease cost and complexity of a farming operation. For example, containers may only be refilled when less than half full, less than a third full, or less than a quarter full. As the plants grows, the plants uptake the solution from the basin and create an increasingly large air gap between the top of the solution and the bottom of the lid. This air gap triggers the formation of very root hairs, which provide the plant with an enhanced ability to absorb the oxygen they need from the air in the headspace of the basin. These root hairs enable the use of stagnant water, which would normally prevent the growth of crops due to its quickly depleted dissolved oxygen. Similarly stated, known containers and known growing systems that allow plant roots to grow directly into water or a liquid growing media are not physically configured to permit plants to grow to maturity without recirculating, agitating, or otherwise reoxygenating the liquid. "Maturity" should be understood as meaning ready to harvest, or otherwise full grown. Some embodiments described herein relate to growing plants in containers in stagnant liquid (i.e., without agitating or recirculating the liquid), it should be understood that liquid may be considered stagnant (i.e., without agitation or recirculation) even if the basin is refilled one or more times.

Plants can remain in the bays until they are ready for harvest. In some implementations, the promotion of air roots allows for particularly intensive and efficient farming, relative to known indoor farming systems. For example, in some implementations crops such as herbs can be grown in the containers without ever needing to refill the basin. Furthermore, because the root structure of such plants is only partially submerged, higher concentrations of nutrients can be used than is typical in hydroponic of flood-drain systems. For example, a typical nutrient concentration in hydroponic and flood-drain systems is 1.5-2 mS/cm. Systems and methods described may use nutrients at concentrations of 2.5 mS/cm, 3.5 mS/cm, or higher. Similarly, unlike known farming systems, some crops can be constantly illuminated. The combination of higher nutrient concentration and constant illumination can significantly reduce time-to-harvest compared to know farming systems.

In some implementations, containers can be retrieved from a bay. Containers are typically infrequently retrieved (e.g., containers may be stored in a bay for at least 1, 3, 5, or 7 days before being retrieved). Containers can be retrieved so that they can be moved from bay to bay as the plants grow, for example, to vary the light exposure, or to place plants in taller bays as they grow. Furthermore, in some embodiments, containers can be removed from bays to be refilled periodically, for example, via a nozzle on the gantry. For example, some particularly thirsty crops, such as lettuce may benefit from periodic replenishment of water and/or nutrients. Containers can also be retrieved for harvest (as discussed in further detail herein) or to be placed in an alternate storage location, including potentially out of doors.

Once the plants have grown and are ready to be harvested, the processing operation begins at 940. The container can be removed from the rack system by the gantry and conveyed to a processing station, for example by cart, forklift, or conveyor belt. There, plants can be manually or mechanically harvested. Plants grown in this manner typically require little or no post-harvest processing, as they can have been grown indoors, without pesticides. In some instances, fruit, leaves, and stems may never have been exposed to water, which can be a potential contamination vector, and therefore may not even require washing. After harvest, the basins and lids can be emptied and reused.

While various embodiments have been described above, it should be understood that they have been presented by way of example only, and not limitation. Although various embodiments have been described as having particular features and/or combinations of components, other embodiments are possible having a combination of any features and/or components from any of the embodiments where appropriate as well as additional features and/or components. Where methods described above indicate certain events occurring in certain order, the ordering of certain events may be modified. Additionally, certain of the events may be performed concurrently in a parallel process when possible, as well as performed sequentially as described above.

Numerical dimensions and other parameters (e.g., weights) are provided to describe various exemplary embodiments. Such description should be viewed as illustrative. Numerical values should be understood as approximate and values +/−10% should be understood as equivalent to the specified values, unless clearly indicated otherwise. Throughout this application, the terms "about" and "approximately" are used to indicate that a value includes variations of +/−20%. When used in conjunction with a range or series of values, the terms "about" and "approximately" apply to the endpoints of the range or each of the values enumerated in the series, unless otherwise indicated. Where a range of values is given, that too should be understood as illustrative.

Some embodiments described herein relate to automation and/or robotic events. It should be understood that such automation can be computer-implemented. That is, where devices, such as the gantry are described as performing actions like moving containers, it should be understood that such actions can be directed by a compute device having a processor and a memory. Processing associated with such computer-implemented events can be performed locally, for example, at a compute device physically co-located with the gantry, and/or remotely, for example, on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A system, comprising:

a plurality of containers, each container from the plurality of containers including a basin and a lid, each basin filled with a solution of water and nutrients, each lid containing a solid growing medium and at least one of a seed or a plant, each lid including an opening configured to allow plant roots to protrude into the basin and access the solution of water and nutrients; and a rack that defines a plurality of bays, the plurality of bays arranged in a plurality of columns and a plurality of rows, each bay having a depth configured to accept at least two containers from the plurality of containers in a single stack configuration, each bay from the plurality of bays including a gravity feed system configured to urge containers from the plurality of containers within that bay towards a front of the rack, each bay from the plurality of bays including a light source and configured to allow the at least one of the seed or the plant in containers from the from the plurality of containers disposed in that bay to grow.

2. The system of claim 1, wherein each bay from the plurality of bays has a depth configured to accept at least three containers from the plurality of containers in a single-stack configuration.

3. The system of claim 1, wherein each bay from the plurality of bays has a depth configured to accept at least eight containers from the plurality of containers in a single-stack configuration.

4. The system of claim 1, wherein the rack includes a gate disposed in front of a bay from the plurality of bays, the gate configured to pivot between an open configuration and a closed configuration, the gate configured to prevent a container from the plurality of containers from exiting that bay in the closed configuration, the gate having a center of gravity below a pivot point of the gate such that the gate automatically closes.

5. The system of claim 1, further comprising a gantry configured to move between the plurality of bays and insert a container from the plurality of containers into a bay from the plurality of bays or retrieve a container from the plurality of bays from a bay from the plurality of bays.

6. The system of claim 1, wherein the rack includes a gate disposed in front of a bay from the plurality of bays, the gate configured to move between an open configuration and a closed configuration, the gate configured to prevent a container from the plurality of containers from exiting that bay in the closed configuration, the system further comprising:

a gantry configured to move between the plurality of bays, the gantry including an actuator configured to move the gate from the closed configuration to the open configuration, the gantry configured to insert a container from the plurality of containers into a bay from the plurality of bays or retrieve a container from the plurality of bays from a bay from the plurality of bays when the gate is in the open configuration.

7. The system of claim 1, wherein each bay from the plurality of bays and each container from the plurality of containers is configured to allow the at least one of the seed or the plant in each container from the plurality of containers to grow to maturity while each container from the plurality of containers is disposed in a bay from the plurality of bays, without recirculation or agitation of the of the solution of water and nutrients in any container from the plurality of containers.

8. A system, comprising:

a plurality of containers, each container from the plurality of containers including a basin and a lid, each basin filled with a solution of water and nutrients, each lid containing a solid growing medium and at least one of a seed or a plant, each lid including an opening configured to allow plant roots to protrude into the basin and access the solution of water and nutrients; and a rack that defines a plurality of bays, the plurality of bays arranged in a plurality of columns and a plurality of rows, each container from the plurality of containers disposed in a bay from the plurality of bays, at least two containers from the plurality of containers disposed, in a single-stack configuration, in one bay from the plurality of bays, each bay from the plurality of bays including a light source configured to illuminate containers from the plurality of containers disposed in that bay, each bay from the plurality of bays and each container from the plurality of containers configured to allow the at least one of the seed or the plant in each container from the plurality of containers to grow to maturity while each container from the plurality of containers is disposed in a bay from the plurality of bays, without recirculation or agitation of the solution of water and nutrients in any container from the plurality of containers.

9. The system of claim 8, wherein each bay from the plurality of bays includes a gravity feed system configured to urge containers from the plurality of containers within that bay towards a front of the rack.

10. The system of claim 8, wherein each container from the plurality of containers defines a plurality of slots, each slot from the plurality of slots including the solid growing medium and at least one of a seed or a plant, each slot from the plurality of slots including an opening configured to allow plant roots to protrude into the basin and access the solution of water and nutrients.

11. The system of claim 8, wherein each bay from the plurality of bays and each container from the plurality of containers is configured to allow the at least one of the seed or the plant in each container from the plurality of containers to grow to maturity while each container from the plurality of containers is disposed in a bay from the plurality of bays, without filling or draining any container from the plurality of containers.

12. The system of claim 8, wherein:

each bay from the plurality of bays includes a gravity feed system configured to urge containers from the plurality of containers within that bay towards a front of the rack; and the rack includes a gate disposed in front of a bay from the plurality of bays, the gate configured to pivot between an open configuration and a closed configuration, the gate configured to prevent a container from the plurality of containers from exiting that bay in the closed configuration, the system further comprising:

a gantry configured to move between the plurality of bays and insert a container from the plurality of containers into a bay from the plurality of bays or retrieve a container from the plurality of bays from a bay from the plurality of bays.

\*  \*  \*  \*  \*